No. 12,576. REISSUED DEC. 11, 1906.

C. H. LANE.

AIR SEPARATOR.

APPLICATION FILED MAR. 18, 1904.

Witnesses

J. B. Hull.

H. G. Emerson.

Inventor

Charles H. Lane,

By his Attorneys,

Thurston & Bates.

THE NORRIS PETERS CO., WASHINGTON, D. C.

UNITED STATES PATENT OFFICE.

CHARLES H. LANE, OF CLEVELAND, OHIO.

AIR-SEPARATOR.

No. 12,576. Specification of Reissued Letters Patent. Reissued Dec. 11, 1906.

Original No. 728,475, dated May 19, 1903. Application for reissue filed March 18, 1904. Serial No. 198,851.

*To all whom it may concern:*

Be it known that I, CHARLES H. LANE, a citizen of the United States, residing at Cleveland, in the county of Cuyahoga and State of Ohio, have invented a certain new and useful Improvement in Air-Separators, of which the following is a full, clear, and exact description, reference being had to the accompanying drawings.

This invention relates to air-separators which are used generally for separating or sorting finely-divided particles of a conglomerate material by means of an air-current and utilizing the difference in the weight of the constituent particles of the material. Such apparatus has a wide field of usefulness in the treatment of crushed mineral ores, and my invention is especially adapted to use in this connection. An apparatus of this kind usually includes an inclined tube through which an upwardly-inclined air-current is produced, while revolving beaters agitate the material and raise its particles so that they come successively under the influence of the air-current.

The object of this invention is to provide an improved form of apparatus, especially in respect to its beaters, which can adapt itself to the treatment of different grades and classes of material or to variations in the condition of the material treated.

Figure 1:
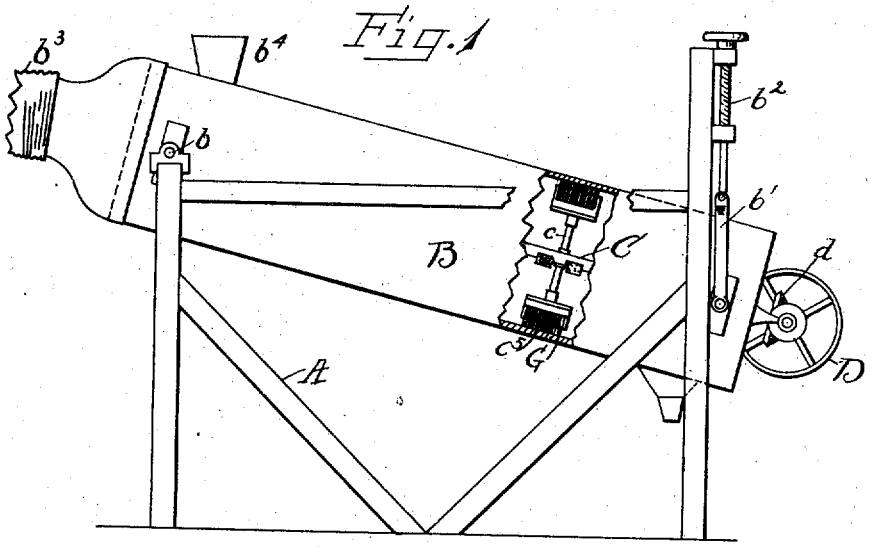
Figure 3:
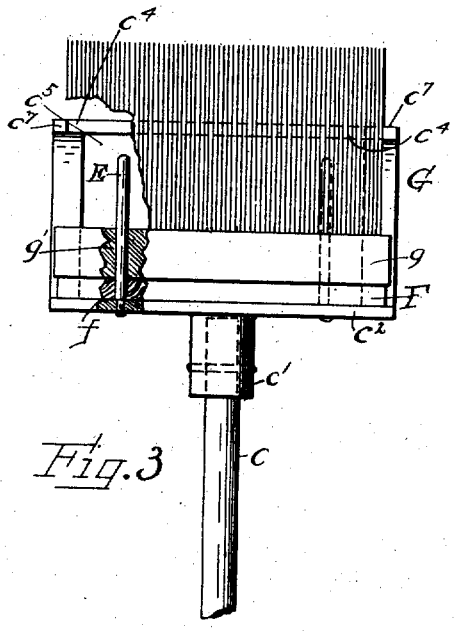
Figure 2:
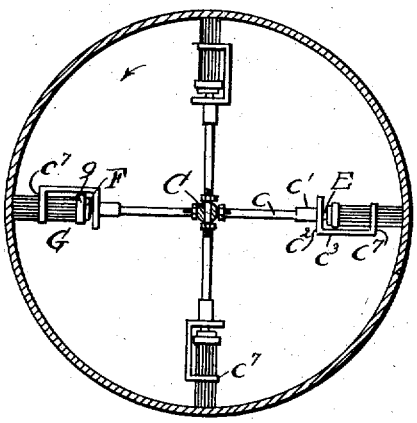

In the drawings, which fully illustrate my invention, Figure 1 represents a side elevation of an air-separator embodying my invention, part of which is broken away, exposing the interior, as shown. Fig. 2 represents a cross-section of an air-tube used in connection with my invention, and Fig. 3 is an enlarged detail elevation of beaters used in connection with this apparatus.

Referring to the parts by letters, A represents a frame or crib adapted to support an inclined air-tube B. This tube, which is circular in section, is supported at its outer end on trunnions $b$, and its lower extremity is suspended from the pivoted yoke $b'$, carried by the adjusting-screw $b^2$. A flexible hood $b^3$ affords means for connecting the upper end of this tube with a suction-fan, wherefore air may be drawn upwardly in the tube, entering through its lower end, which is open for this purpose. A hopper $b^4$, located preferably near the upper end of the tube, affords means for supplying material to the tube.

Axially mounted within the tube B is a shaft C, adapted to be continuously driven by means of the bevel-gears $d$ and the belt-pulley D or by any other suitable means. This shaft carries in any suitable manner radially-projecting beater-arms $c$, preferably arranged alternately in planes at right angles to each other, as indicated. At their extremities these arms carry heads $c'$, rigidly attached to them, and each of these heads comprises a base-plate $c^2$, the preferably integral back plate $c^3$ lying at right angles to the base and the turned-over tip or flange $c^4$, and its back plate may be cut away, as at $c^5$, to lighten it and reduce its resistance to the air. Studs E, preferably two in number, project radially from the base $c^3$, and flat blocks or weights F, having openings $f$ to receive these pins, lie adjacent to the bases, as clearly shown in Fig. 3. Beyond the weights F are the brushes G, the backs $g$ of which are similarly provided with openings $g'$ to receive the aforesaid studs. The "bristles" of the brushes are preferably of wire, and the rotation of the shaft C being in the direction of the arrow in Fig. 2 the same will be backed or supported by the aforesaid flange $c^4$. The heads $c$ may have the lateral arms $c^7$, which lie against the bristles at the ends of the brush, to prevent the bristles from spreading. Now as rotation of the shaft $c$ takes place the centrifugal force tends to force the weights F outwardly and maintains the ends of the bristles against the inner side of the tube with a pressure depending upon the velocity of rotation and the mass of the weights. Hence other weights may be substituted for those shown, so that any desired pressure at any velocity may be attained. Indeed, the weights may be parts of the backs of the brushes, which is to say that the said backs may be heavy enough to render it unnecessary to use independent weights. The brushes have the effect of breaking up the material where it has become matted together and also to lift the particles from the bottom, whereby the lighter particles will be brought within the influence of the air-current. As the brushes become worn away at their tips they evidently always adjust themselves automatically, so that they make the desired contact with the wall of the tube, and it will also be observed that the flanges $c^4$ of the heads support them at an unvarying distance from the wall of the tube, which is also advantageous.

It will be understood that the manner of supporting the tube B may be changed and so, also, may the means for rotating the shaft C. In fact, the specific exemplification of the invention shown is not material to the invention to any greater extent than is specified in the claims.

Having described my invention, I claim—

1. In an air-separator, in combination, an inclined air-tube, revoluble beater-arms mounted within said tube, weights slidably mounted thereon and adapted to be thrown outwardly by centrifugal force, and brushes adapted to be held against the inner wall of said tube by the force acting on said weights, for the purpose specified.

2. In an air-separator, in combination, an inclined air-tube adapted for circulation of an air-current therethrough, revoluble beater-arms mounted within said tube, weights slidable thereupon and adapted to be thrown outwardly by centrifugal force, and brushes also slidably mounted upon said arms and adapted to be forced against the inner wall of said tube by the action of said centrifugal force upon said weights, for the purpose specified.

3. In an air-separator, in combination, an inclined air-tube, adapted for the circulation of an air-current therethrough, revoluble arms mounted within said tube, weights carried by said arms near the extremities thereof, means for guiding said weights radially outward upon said arms, and brushes movably carried by said arms beyond said weights, said brushes being adapted to contact with the inner side of the wall of said tube, for the purpose specified.

4. In an air-separator, in combination, an inclined air-tube adapted for the circulation of an air-current therethrough, a revoluble shaft mounted within said tube, arms secured to said shaft, heads carried by said arms at their outer extremities, studs carried by said heads and projecting radially with respect to the axis of rotation of said arms, and brushes slidably mounted upon said studs, and being so arranged that the tips thereof contact with the wall of said tube, for the purpose specified.

5. In an air-separator, in combination, an inclined air-tube, adapted for the circulation of an air-current therethrough, a revoluble shaft mounted within said tube, arms secured to said shaft, heads carried by said arms at their outer extremities, outwardly-projecting studs carried by said heads, weights having openings adapted to receive said studs, and brushes the backs whereof are also provided with openings to receive said studs, the tips of said brushes being adapted to contact with the wall of said tube, for the purpose specified.

6. In an air-separator, in combination, an inclined air-tube adapted for the circulation of an air-current therethrough, revoluble arms mounted within said tube, heads carried by said arms at their extremities, outwardly-extended studs carried by said heads, and brushes having openings in their backs adapted to receive said studs, said heads having each a flanged back plate, the flanges of which engage with the bristles, for the purpose specified.

7. In an air-separator, in combination, an inclined air-tube adapted for the circulation of an air-current therethrough, revoluble arms mounted within said tube, heads carried by said arms at their extremities, outwardly-extended studs carried by said heads, and brushes having openings in their backs adapted to receive said studs, said heads having each a flanged back plate, the flanges of which engage with the bristles, said back plate having also the side arms T, for the purpose specified.

8. In an air-separator composed of an inclined cylindrical air-tube, a rotatable shaft disposed axially within said tube, rigid radial arms fastened to said shaft, brushes supported by and freely movable outward upon said arms in radial directions under the influence of centrifugal force, and a suction-fan connected with the upper end of said air-tube whereby a current of air is caused to flow upward through the same, for the purpose specified.

9. In an air-separator composed of an inclined cylindrical air-tube, a rotatable shaft disposed axially within said tube, rigid radial arms fastened to said shaft, brushes supported by and freely movable outward upon said arms in radial directions under the influence of centrifugal force, there being a bar secured to each arm in contact with the rear side of the bristles of the associated brush, and a suction-fan connected with the upper end of said air-tube whereby a current of air is caused to flow upward through the same, for the purpose specified.

In testimony whereof I hereunto affix my signature in the presence of two witnesses.

CHARLES H. LANE.

Witnesses:

E. L. THURSTON,

ALBERT H. BATES.